ized rosin, dehydrogenated rosin and cracked
UNITED STATES PATENT OFFICE 2,568,743

PROCESS FOR RESOLVING EMULSIONS

Willard H. Kirkpatrick, Sugar Land, Tex., assignor to Visco Products Company, Houston, Tex., a corporation of Delaware No Drawing. Application December 14, 1948,
Serial No. 65,293

4 Claims. (Cl. 252—341)

This invention relates in particular to the treatment of emulsions of mineral oil and water, such as petroleum emulsions commonly encountered in the production, handling and refining of crude mineral oil, for the purpose of separating the oil from the water. Also the invention relates to the treatment of other water-in-oil type of emulsions wherein the emulsions are produced artificially or naturally and the resolution of the emulsions presents a problem of recovery or disposal.

Petroleum emulsions are in general of the water-in-oil type wherein the oil acts as a continuous phase for the dispersal of finely divided particles of naturally occurring waters or brines. These emulsions are often extremely stable and will not resolve on long standing. It is to be understood that water-in-oil emulsions may occur artificially resulting from any one or more of numerous operations encountered in various industries. The emulsions obtained from producing wells and from the bottom of crude oil storage tanks are commonly referred to as "cut oil," "emulsified oil," "bottom settlings," and "B. S."

One object of my invention is to provide a novel and economical process for resolving emulsions of the character referred to into their component parts of oil and water or brine.

Another object is to provide a novel reagent which is water-wettable, interfacial and surface-active in order to enable its use as a demulsifier or for such uses where the surface-active characteristics are necessary or desirable.

This process involves subjecting an emulsion of the water-in-oil type to the action of a demulsifying agent of the kind hereinafter described, thereby causing the emulsion to resolve and stratify into its component parts of oil and water or brine after the emulsion has been allowed to stand in a relatively quiescent state.

Another process involves the use of a demulsifying agent of the kind hereinafter described in acidizing operations on petroleum producing strata. In such an operation inhibited acid is forced down the well and into the formation under pressure. The acid attacks limestone formation enlarging the fissures and openings through which the oil fluids flow to the well pool, thus increasing the production. Sometimes, particularly troublesome emulsions are encountered immediately after a well has been acidized. This condition can be minimized and many times eliminated by incorporating a suitable demulsifying composition with the acidizing medium.

Still another process involves the use of a demulsifying agent of the kind hereinafter described in refinery desalting operations. In the refining of many crude oils a desalting operation is necessary in order to prevent the accumulation of large deposits of salt in the stills and to prevent corrosion resulting from the decomposition of such salts under high still temperatures. In a typical desalting installation 5 to 10 per cent of fresh water is added to the crude oil charge stock and emulsified therein by means of a pump or through a differential pressure valve. A demulsifying agent is added and the treated oil permitted to stand in a quiescent state for relatively short periods of time allowing the salt-laden water to stratify, whereupon it is bled off to waste resulting in 90% to 98% removal of salt content. This operation is carried out continuously as contrasted with batch treating.

The treating agent employed in accordance with the present invention consists of an acylated derivative of an alkanolamine wherein the acylating radicals comprise two dissimilar carboxy acids, one being an unsaturated long chain acyclic type of carboxy acid containing at least 8 carbon atoms and the other being an unsaturated resin type carboxy acid.

Of the two dissimilar carboxy acids required for acylation, the one is preferably an unsaturated long chain acyclic or fatty type carboxy acid having at least 8 carbon atoms and not more than 32 carbon atoms in the chain. This group of acids may also be called unsaturated detergent forming acids. As examples of acyclic type acids which I have found particularly suitable for my purpose I may mention: linolenic acid, linoleic acid, oleic acid, mixtures thereof and other commonly available unsaturated long chain acyclic acids. Certain of these acids (e. g., linoleic acid and linolenic acid), may also be called drying oils. Satisfactory results have been obtained by the practice of the invention wherein the drying oil acids have been partially blown.

The other dissimilar type of carboxy acid required for my process is a carbocyclic carboxy acid of the terpene type, preferably a rosin acid. The most commonly available rosin acids are abietic acid and related derivatives derived from naval stores. Other acidic resins, e. g., polymerized rosin, dehydrogenated rosin and cracked copals (for example, run Congo) may be employed.

The dissimilarity of these two types of carboxy acids is characterized by the acyclic type being a long chain carboxy acid, whereas the rosin type is a carbocyclic carboxy acid of the terpene type.

While any blend of the dissimilar acids can be prepared, my preferred mixture of dissimilar carboxy acids is readily obtainable as a naturally occurring mixture of dissimilar carboxy acids known in the trade as tall oil. Tall oil is the liquid resin obtained in digesting wood to wood pulp in the paper industry. It is a dark brown, viscous liquid containing a crystalline sediment of abietic acid. From the results of several investigators the following principal constituents of tall oil are indicated: resin acids 30% to 45%, fatty acids 45% to 60%, unsaponifiable matter 6% to 12%. The total acid forming the lesser of the carboxy acids component is at least 30% by weight of the whole of the carboxy acids mixture. The unsaponifiable portion is a yellow viscous oil containing a waxy or pitchy material. The specifications of the particular grade of tall oil which it is preferable to use are as follows:

| | |
|---|---|
| Specific gravity (at 15.5 degrees C.) | .9697 |
| Acid number | 164.0 |
| Saponification number | 173.6 |
| Ester number | 9.4 |
| Per cent moisture | 0.0 |
| Per cent rosin acids | 39.2 |
| Per cent fatty acids (by difference) | 52.79 |
| Per cent linolenic acid | 19.25 |
| Per cent linoleic acid | 10.5 |
| Per cent oleic acid | 23.04 |
| Per cent unsaponifiable | 8.01 |
| Iodine number | 148.83 |
| Thiocyanogen—Iodine number | 91.1 |
| Per cent saturated fatty acids | None |
| Per cent unsaturated fatty acids | 100 |
| Titer test (degrees C.) | 5.5 |
| Pour test (degrees C.) | 4.4 |
| Cloud test (degrees C.) | 10–12.8 |

Examples of suitable alkanolamines for my purpose are as follows: diethanolamine, octylethanolamine, cyclohexylethanolamine, benzylethanolamine, hydroxypropyldiethanolamine, triisopropanolamine, cyclohexyldiethanolamine, octadecyldiethanolamine, etc. Alkanolamines with ether linkages in the alkyl group are intended as functional equivalents. Products having demulsifying characteristics can be prepared from alkanolamines having at least two hydroxyl groups in the molecule but tertiary alkanolamines having three or more hydroxyl groups in the molecule are to be preferred.

My preferred alkanolamine is triethanolamine which is a viscous and very hygroscopic liquid which boils at 244 degrees C. at 50 mm. pressure. The commercial product which is used for the purpose of the invention contains not more than 2.5% monoethanolamine and not more than 15% diethanolamine and not less than 80% triethanolamine. The neutral equivalent of the commercial product will average about 140 and is entirely satisfactory for my purpose.

The preparation of the demulsifying composition is carried out by heating the alkanolamine and the dissimilar carboxy acids, wherein the alkanolamine is present in substantial molar excess, to elevated temperatures. This condensation reaction results in the elimination of large quantities of aqueous distillate. There is present substantial quantities of nitrogen bodies in the aqueous distillate. The condensation reaction is carried out in the absence of any azeotropic solvent for it has been found that the demulsifying characteristics are diminished when the aqueous distillate is removed as an azeotrope.

It is essential that the alkanolamine be present in substantial molar excess as related to the dissimilar carboxy acids. In other words, the quantity of the alkanolamine should be such that there are hydroxyl groups present in excess of those required to react with the carboxy groups of the carboxy acids in the acylation reaction. For purposes of this invention it has been found that suitable products can be prepared wherein the alkanolamine is present within the range of 100% to 600% molar excess.

The exact nature of these compositions is not known. Exhaustive efforts to analyze the materials for purposes of identification have been fruitless. There can be no question but what the carboxylic radicals are acylated by hydroxyl groups to form the alkanolamine esters. Such a reaction, however, accounts for only a minor portion of the aqueous distillate secured. Undoubtedly the balance of the aqueous distillate results from a further condensation and/or polymerization of the alkanolamine molecule.

In order to illustrate specifically the new types of materials contemplated for use in accordance with the present invention, the following examples are set forth below as being typical of products suitable for use. It is to be understood, however, that I do not confine myself to the specific chemicals, or proportions thereof, set forth in these examples as it will be obvious that equivalents of these chemicals and other proportions may be used without departing from the spirit of the invention or the scope of the appended claims. In the examples, the quantities are stated in parts by weight.

*Example I*

In a suitable reaction vessel provided with a means for removal of any aqueous distillate which forms, 714 parts of triethanolamine and 604 parts of tallol were heated with stirring to 250 degrees C. The reaction mass was held at this temperature for 6 hours and an aqueous distillate was secured in accordance with the following log:

| Time | Temperature, ° C. | Parts Aqueous Distillate |
|---|---|---|
| 12:30 | 170 | Began |
| 1:45 | 250 | 38 |
| 4:00 | 250 | 103 |
| 5:10 | 253 | 129 |
| 7:45 | 250 | 155 |

The product at this stage was entirely too viscous for customary handling by the petroleum industry. Two hundred (200) parts of a suitable hydrocarbon vehicle such as sulfur dioxide extract was added to yield the finished product.

*Example II*

In a suitable reaction vessel provided with a means for removal of any aqueous distillate which forms, 714 parts of triethanolamine and 604 parts of tallol were heated with stirring to 250 degrees C. The reaction mass was held at this temperature for 9 hours and an aqueous distillate was secured in accordance with the following log:

| Time | Temperature, ° C. | Parts Aqueous Distillate |
|---|---|---|
| 8:30 | 165 | Began |
| 9:45 | 250 | 57 |
| 11:45 | 250 | 129 |
| 1:00 | 250 | 154 |
| 5:00 | 257 | 190 |
| 6:45 | 252 | 199 |

The product at this stage was entirely too viscous for customary handling by the petroleum industry. Two hundred (200) parts of a suitable hydrocarbon vehicle such as sulfur dioxide extract was added to yield the finished product.

Example III

In a suitable reaction vessel provided with a means for removal of any aqueous distillate which forms, 714 parts of triethanolamine and 604 parts of tallol were heated with stirring to 250 degrees C. The reaction mass was held at this temperature for 12 hours and an aqueous distillate was secured in accordance with the following log:

| Time | Temperature, °C. | Parts Aqueous Distillate |
|---|---|---|
| 8:00 | 198 | 26 |
| 9:00 | 240 | 60 |
| 9:30 | 250 | 70 |
| 1:00 | 250 | 160 |
| 2:00 | 250 | 180 |
| 5:00 | 250 | 200 |
| 9:30 | 250 | 220 |

The product at this stage was entirely too viscous for customary handling by the petroleum industry. Two hundred (200) parts of a suitable hydrocarbon vehicle such as sulfur dioxide extract was added to yield the finished product.

Example IV

In a suitable reaction vessel provided with a means for removal of any aqueous distillate which forms, 600 parts of tallol and 800 parts of a still residue (Amine Residue T or Polyamine T) secured from the commercial manufacture of triethanolamine was heated with stirring to secure an aqueous distillate in accordance with the following log:

| Time | Temperature, °C. | Parts Aqueous Distillate |
|---|---|---|
| 9:25 | 144 | 4 |
| 11:10 | 231 | 70 |
| 1:45 | 250 | 138 |
| 2:00 | 250 | 140 |

It was determined that the removal of further quantities of aqueous distillate resulted in a rubbery-like mass which could not be further handled. To the above product from which 140 parts of aqueous distillate had been removed there was added 100 parts of a suitable hydrocarbon vehicle and 100 parts of acetone to yield the finished product having the desired viscosity.

Example V

In a suitable reaction vessel provided with a mean for removal of any aqueous distillate which forms, 225 parts oleic acid, 225 parts abietic acid and 900 parts triethanolamine were heated to 250 degrees C. for 12 hours. An aqueous distillate was removed in accordance with the following log:

| Time | Temperature, °C. | Parts Aqueous Distillate |
|---|---|---|
| 10:50 | 178 | Began |
| 11:55 | 250 | 64 |
| 12:30 | 251 | 127 |
| 3:00 | 250 | 185 |
| 5:00 | 250 | 223 |
| 11:45 | 250 | 260 |

To the above product there was added 500 parts of a suitable hydrocarbon vehicle to yield the finished product having a suitable viscosity.

Example VI

In a suitable reaction vessel provided with a means of removal of any aqueous distillate which forms, 500 parts of tallol and 750 parts of triethanolamine were mixed with stirring and heated as rapidly as possible to 300 degrees C. During the course of this heating an aqueous distillate formed and was collected as follows:

| Time | Temperature, °C. | Parts Aqueous Distillate |
|---|---|---|
| 11:15 | 170 | Began |
| 12:15 | 250 | 60 |
| 1:05 | 267 | 120 |
| 2:05 | 280 | 200 |
| 3:25 | 300 | 277 |

At the final heating there was evidence of severe foaming, as well as incipient gelation. To secure a product having a suitable viscosity it was necessary to add 400 parts of a hydrocarbon vehicle such as sulfur dioxide extract.

Example VII

In a suitable reaction vessel provided with a means for removal of any aqueous distillate which forms, 500 parts of tallol and 750 parts of triisopropanolamine were mixed with stirring to 250 degrees C. and held at that point for 12 hours. During the course of heating, an aqueous distillate formed and was collected as per the following log:

| Time | Temperature, °C. | Parts Aqueous Distillate |
|---|---|---|
| 10:30 | 130 | 6.5 |
| 11:45 | 250 | 63 |
| 3:30 | 250 | 100 |
| 11:45 | 250 | 137 |

To this product there was added 500 parts of a suitable hydrocarbon vehicle to yield the final composition.

The above examples are only a few of the many products which may be prepared according to the principles disclosed in the foregoing discussion. Various examples of the many products which answer the description herein made are contemplated; some may be oil soluble and others water soluble, and in many instances they may possess dual solubility to an appreciable extent. The suitability of any of the products for the breaking and resolving of any given emulsion can readily be determined by conventional procedures. The products may be used as such for resolving emulsions of the water-in-oil type or they may be admixed with other demulsifying reagents in varying ratios as required by the problem at hand.

The suitable hydrocarbon vehicle referred to in the examples is sulfur dioxide ($SO_2$) extract. This material is a by-product from the Edeleanu process of refining petroleum in which the undesirable fractions are removed by extraction with liquid sulfur dioxide. After removal of the sulfur dioxide a mixture of hydrocarbons, substantially aromatic in character, remains which is designated in the trade as $SO_2$ extract. Examples of other suitable hydrocarbon vehicles are toluene, xylene, gas oil, diesel fuel, bunker fuel and coal tar solvents.

The improved demulsifying reagents prepared in accordance with the present invention are preferably used in the proportion of one part of reagent to from 2,000 to 30,000 parts of emulsion either by adding the concentrated product directly to the emulsion or after diluting with a suitable vehicle in the customary manner.

The invention is hereby claimed as follows:

1. A process for breaking emulsions of the water-in-oil type which comprises subjecting such emulsions to the action of a condensation reaction product of an alkanolamine containing at least two hydroxy groups in its molecule and a mixture of at least two dissimilar unsaturated mono-carboxy acids wherein at least one of said acids is a carbocyclic resin acid and another of said acids is of the acyclic type having at least 8 and not more than 32 carbon atoms in the chain, the quantity of the alkanolamine being a 100% to 600% molar excess of that quantity theoretically required for the acylation of the hydroxyl groups contained in said alkanolamine by the carboxy groups contained in said acids, the condensation being effected by heating with the elimination of water to temperatures within the range of 130° C. to 300° C. and stopping the reaction short of gelation.

2. A process for breaking emulsions of the water-in-oil type which comprises subjecting such emulsions to the action of a condensation reaction product of an alkanolamine having three hydroxyl groups and a mixture of at least two dissimilar unsaturated mono-carboxy acids wherein at least one of said acids is a carbocyclic resin acid and another of said acids is of the acyclic type having at least 8 and not more than 32 carbon atoms in the chain, the quantity of the alkanolamine being a 100% to 600% molar excess of that quantity theoretically required for the acylation of the hydroxyl groups contained in said alkanolamine by the carboxy groups contained in said acids, the condensation being effected by heating with the elimination of water to temperatures within the range of 130° C. to 300° C. and stopping the reaction short of gelation.

3. A process for breaking emulsions of the water-in-oil type which comprises subjecting such emulsions to the action of a condensation reaction product of triethanolamine and a mixture of at least two dissimilar unsaturated mono-carboxy acids wherein at least one of said acids is a carbocyclic resin acid and another of said acids is of the acyclic type having at least 8 and not more than 32 carbon atoms in the chain, the quantity of triethanolamine being a 100% to 600% molar excess of that quantity theoretically required for the acylation of the hydroxyl groups contained in said triethanolamine by the carboxy groups contained in said acids, the condensation being effected by heating with the elimination of water to temperatures within the range of 130° C. to 300° C. and stopping the reaction short of gelation.

4. A process for breaking a water-in-oil emulsion which comprises mixing such an emulsion with a condensation reaction product of an alkanolamine and tallol made by heating with the elimination of water tallol with an alkanolamine comprising essentially triethanolamine at temperatures within the range of 130 degrees C. to 300 degrees C. in proportions corresponding to a molar excess of triethanolamine over the carboxy acids of said tallol in the range of 100% to 600% of that quantity theoretically required for the acylation of the hydroxyl groups contained in said alkanolamine by the carboxy groups contained in the tallol acids and stopping the reaction short of gelation.

WILLARD H. KIRKPATRICK.

REFERENCES CITED

The following references are of record in the file of this patent:

UNITED STATES PATENTS

| Number | Name | Date |
|---|---|---|
| 1,977,089 | Roberts | Oct. 16, 1934 |
| 1,978,227 | Roberts | Oct. 23, 1934 |
| 2,166,434 | De Groote | July 18, 1939 |
| 2,192,993 | De Groote et al. | Mar. 12, 1940 |
| 2,214,784 | Wayne | Sept. 17, 1940 |
| 2,296,600 | De Groote et al. | Sept. 22, 1948 |